Aug. 18, 1925.  1,550,279
J. J. PETRASEK
CLUTCH BRAKE
Filed Dec. 26, 1924
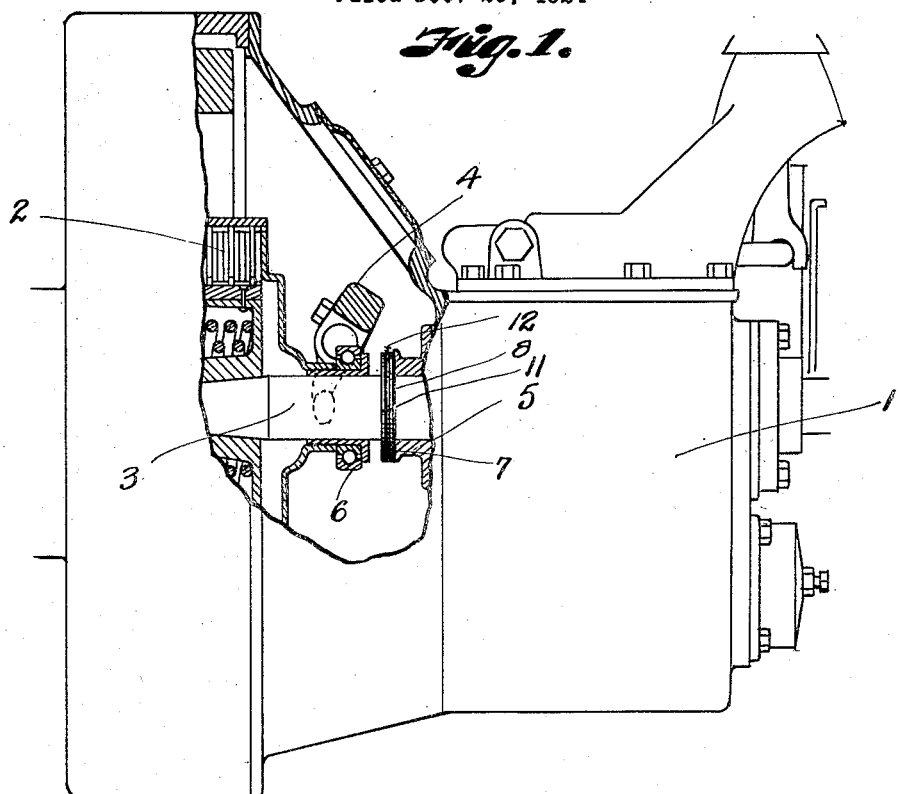
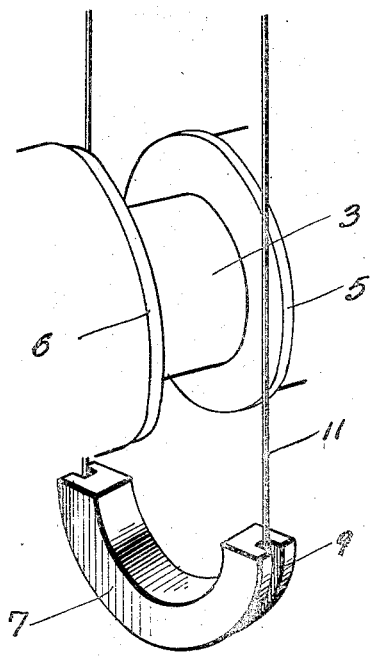
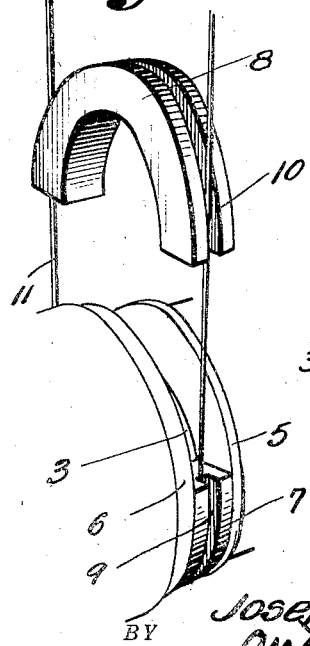
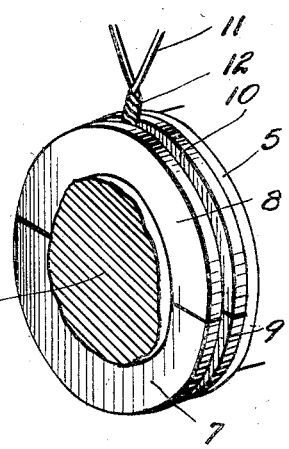
INVENTOR
Joseph J. Petrasek
BY
ATTORNEY Patented Aug. 18, 1925.

1,550,279

UNITED STATES PATENT OFFICE.

JOSEPH J. PETRASEK, OF KANSAS CITY, MISSOURI.

CLUTCH BRAKE.

Application filed December 26, 1924. Serial No. 757,977.

*To all whom it may concern:*

Be it known that I, JOSEPH J. PETRASEK, a citizen of the United States, residing at Kansas City, in the county of Jackson and State of Missouri, have invented certain new and useful Improvements in Clutch Brakes; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a clutch brake associated with the transmission or change speed mechanism of a motor vehicle and with the clutch shifter so that when the clutch between the engine shaft and the transmission is disconnected, the clutch shifter can bind against the brake to slow down the gears in the transmission so that the gear shift can be easily accomplished. Broadly, mechanism designed for this accomplishment has been in use prior to my invention but inasmuch as the clutch brake consists of a collar on the clutch shaft and inasmuch as the frictional contact of the clutch shifter with the collar in time wears the collar so that it must be replaced, it is important that a convenient means be provided for renewing the clutch brake or collar. Ordinarily the collar has consisted heretofore of a continuous ring so in order to remove it and substitute a new collar when the old one becomes worn, it has been necessary to practically take down the transmission on certain types of installations.

My invention contemplates the provision of a sectional clutch collar which may be readily applied to the clutch shaft and as easily removed when occasion demands and to this end the invention consists in certain parts and combinations of parts, all of which will be specifically referred to hereinafter, reference being had to the accompanying drawings, in which—

Fig. 1 is a side elevational view of the clutch housing, the transmission housing and the clutch shaft, parts being shown in section.

Fig. 2 is a perspective view of the clutch shaft showing one member of the clutch collar or clutch brake in position to be applied.

Fig. 3 is a perspective view showing the clutch collar member illustrated in Fig. 2 in place and the complementary clutch collar member in position to move into place and Fig. 4 is a perspective view of the clutch collar complete.

The transmission is generically designated 1, the clutch 2, the clutch shaft 3, the clutch shifter 4. All of the elements just described are well known. On the transmission housing is a fixed collar 5. The clutch shifter has a collar 6 movable toward the collar 5. On the shaft 3 is located the clutch collar or clutch brake consisting of two semi-circular members 7 and 8. Each member is provided with a groove in its periphery. The groove 9 in the member 7 coincides with the groove 10 in the member 8 so that when the two members are brought together, the two grooves 9 and 10 are merged into an annular groove to receive the tying wire 11.

In applying the clutch brake the semi-circular member 7 first has the wire 11 applied to it by placing the wire in the groove 9, while the clutch is "in", that is while the clutch is clamped to the drive shaft of the motor. The reason for this is that when the clutch is in clutching engagement, there is a wider gap between the collars 5 and 6 than when the clutch is out of engagement.

When the collar member 7 is pulled into position by the wire 11 so it will assume the position shown in Fig. 3, the clutch is let out of clutch engagement so that the collar 6 will clamp the member 7 between 6 and 5 and hold it there as shown in Fig. 3. Then the clutch member 8 is threaded on the wire or flexible binder 11 as shown in Fig. 3 and the clutch is then let in enough to release engagement with the member 7 so that the member 8 can slip down over the shaft 3 so that the ends of the member 8 will contact with the ends of the member 7. Then the clutch is let out again, so that the collar 6 will bind both members 7 and 8 against the collar 5.

While the members 7 and 8 are bound by the collars 5 and 6, the wire or flexible binder 11 is twisted as indicated at 12 to tie the two members 7 and 8 together. The brake is now in place. Thereafter when the clutch is let out the collar 6 will frictionally bind against the brake and since the brake will bind against the collar 5, it will constitute a braking surface which will slow down the speed of the shaft 3 and as the shaft 3 controls the gears in the transmission 1, the gears will slow down so that the necessary gear shift can be made.

When the brake becomes worn, it will be necessary only to release the binder 11, throw in the clutch and remove the elements 7 and 8 so that new ones can be substituted as above described. The clutch members 7 and 8 may consist of any appropriate material but I recommend lignum-vitæ but I do not wish to be limited to any particular material.

It will be apparent from the foregoing that the brake may be conveniently constructed, that it may be easily applied and that it may be expeditiously removed.

What I claim and desire to secure by Letters-Patent is:—

1. A clutch brake for motor vehicles comprising a sectional ring, the edges of the sections being provided with grooves and a flexible binder receivable in the grooves for securing the sections together to form a relatively rigid ring.

2. In combination with the transmission casing, of a motor vehicle and the clutch shifter thereof, the transmission casing and clutch shifter being provided with collars and a shaft passing through the collars of a sectional brake ring on the shaft between the collars and a flexible binder for securing the sections together.

3. In combination with the transmission casing, of a motor vehicle and the clutch shifter thereof, the transmission casing and clutch shifter being provided with collars and a shaft passing through the collars of a sectional brake ring on the shaft between the collars and a flexible binder for securing the sections together, the binder having ends twisted together.

4. In combination with the transmission casing, of a motor vehicle and the clutch shifter thereof, the transmission casing and clutch shifter being provided with collars and a shaft passing through the collars of a sectional brake ring on the shaft between the collars and a flexible binder for securing the sections together, the binder being received in a groove in the sectional ring.

5. A clutch brake collar comprising two semi-circular members, each provided with an edge groove whereby the members may be slipped over the transmission shaft of a motor vehicle and a flexible binder receivable in the grooves for fastening the two members together.

In testimony whereof I affix my signature.

JOSEPH J. PETRASEK.